(12) United States Patent
Imaizumi

(10) Patent No.: US 7,433,094 B2
(45) Date of Patent: Oct. 7, 2008

(54) IMAGE READING APPARATUS AND LIGHT SOURCE

(75) Inventor: Yukihiro Imaizumi, Okazaki (JP)

(73) Assignee: Minolta Company, Ltd., Osaka (JP)

( * ) Notice: Subject to any disclaimer, the term of this patent is extended or adjusted under 35 U.S.C. 154(b) by 954 days.

(21) Appl. No.: 10/629,553

(22) Filed: Jul. 30, 2003

(65) Prior Publication Data

US 2004/0021914 A1 Feb. 5, 2004

(30) Foreign Application Priority Data

Jul. 30, 2002 (JP) .............................. 2002-221197

(51) Int. Cl.
*H04N 1/04* (2006.01)
*H01J 11/00* (2006.01)
(52) U.S. Cl. ....................... 358/475; 358/474; 358/482; 313/607
(58) Field of Classification Search ................ 358/475, 358/474, 482; 313/607, 594
See application file for complete search history.

(56) References Cited

U.S. PATENT DOCUMENTS 3,442,582 A * 5/1969 Lahr ........................... 353/29
4,342,511 A * 8/1982 Routt et al. .................... 355/1
4,695,763 A * 9/1987 Ogasawara et al. ......... 313/487
2002/0044457 A1* 4/2002 Ono ........................... 362/561

FOREIGN PATENT DOCUMENTS

| JP | 61-185857 | 8/1986 |
|---|---|---|
| JP | 5-217559 | 8/1993 |
| JP | 2001-335448 | 2/2001 |

* cited by examiner

*Primary Examiner*—Houshang Safaipour
(74) *Attorney, Agent, or Firm*—Morrison & Foerster LLP

(57) ABSTRACT

A first light source having first and second light transmission areas that extend along the axial direction and face each other, a conveyance unit that conveys the original document sheet such that it faces the first light transmission area, and a reading unit that receives the light that illuminates the original document sheet and is reflected thereby and reads the image of the original document sheet are included, wherein the light emitted via the first light transmission area and reflected by the original document sheet is led to the reading unit via the first and second light transmission areas.

As a result, illumination efficiency improves, and reduced power consumption and prevention of heat generation can be achieved.

7 Claims, 5 Drawing Sheets

IMAGE READING APPARATUS AND LIGHT SOURCE

The present application claims priority to Japanese Patent Application No. 2002-221197 filed Jul. 30, 2002, the entire content of which is hereby incorporated by reference.

BACKGROUND OF THE INVENTION

1. Field of the Invention

The present invention relates to an image reading apparatus that scans an original document and reads the image thereof, and more particularly to an illuminating device that illuminates the original document. It also relates to a light source that is used in such image reading apparatus.

2. Description of the Related Art

FIG. 8 shows a cross-sectional side elevation of a conventional image reading apparatus that scans an original document and reads the image thereof. The image reading apparatus 1 comprises a main body 2 and a cover 3 that is pivotally supported to the main body 2, such that the cover 3 can be rotated up from the right-hand side thereof in the figure. A conveyance unit 5 that conveys the original document sheet W using multiple rollers 5a is disposed at one end of the cover 3.

A glass plate 14 is disposed on the surface of the cover 3 located below the conveyance unit 5 such that the original document sheet W can be conveyed while remaining in contact with the glass plate 14. A paper supply tray 4, in which are housed the sheets of the original document W that are supplied to the conveyance unit 5, is disposed adjacent to the conveyance unit 5. It is also possible to rotate the cover 3 up and place an original document sheet W on the top surface 2a of the main body 2.

Inside the main body 2 are disposed moving units 6 and 7 that can move rightward and leftward (hereinafter the path along which they travel is termed the 'scanning path') in the figure. FIG. 9 shows the details of the moving units 6 and 7 as well as the conveyance unit 5. A light source 8 that emits illuminating light from an angled direction relative to the original document sheet W placed on the glass plate 14 is disposed inside the moving unit 6.

The light source 8 is formed in the form of a cylinder that extends perpendicular to the scanning path. FIG. 10 shows a cross-sectional view of the light source 8. The light source 8 comprises a cylindrical glass tube 18 having a fluorescent body 23 applied to the inner wall thereof, and electrodes 21 and 22 mounted to the external circumferential wall thereof. The glass tube 18 is filled with a rare gas 24 such as xenon gas.

The glass tube 18 has a non-applied area 18a on which the fluorescent body 23 is not applied. Because the non-applied area 18a transmits light, this part comprises a light transmission area 8a. When a voltage is impressed between the electrodes 21 and 22, the fluorescent body 23 generates light, which is then emitted via the light transmission area 8a as illuminating light.

In FIGS. 8 and 9, a reflection mirror 9 that reflects the light emitted by the light source 8 and reflected from the original document sheet W is disposed inside the moving unit 6. Reflection mirrors 10 and 11 that receive the reflected light from the reflection mirror 9 and lead it along the scanning path are disposed inside the moving unit 7. An image forming lens 12 and reading unit 13 are disposed in the lower part of the main body 2 such that they face the reflection mirror 11. The image forming lens 12 receives the light reflected by the reflection mirror 11 and causes it to form an image. The reading unit 13 comprises a CCD, which receives the image formed by the image forming lens 12 and converts it into electrical signals.

In the image reading apparatus 1 having the construction described above, when an original document W is placed in the paper supply tray 4 and the conveyance unit 5 is driven, a voltage is impressed between the electrodes 21 and 22 of the light source 8 with the moving units 6 and 7 positioned as shown in FIG. 8. In the light source 8, the fluorescent body 23 generates light and illuminating light is emitted via the light transmission area 8a.

The illuminating light illuminates the original document sheet W that is conveyed at a prescribed speed by the conveyance unit 5, and the light reflected from the original document sheet is further reflected by the reflection mirrors 9, 10 and 11, whereby it is caused by the image forming lens 12 to form an image on the reading unit 13. Consequently, the reading unit 13 reads the image of the original document sheet, and electrical signals corresponding thereto are output from the reading unit 13.

When an original document sheet W is placed on the top surface 2a of the main body 2, the moving units 6 and 7 move at a prescribed speed along the scanning path. As a result, as the moving units 6 and 7 move, the reflection mirrors 9, 10 and 11 move to positions 9', 10' and 11', respectively, scanning the original document sheet W, and the image thereof is read by the reading unit 13.

However, according to the conventional image reading apparatus 1 described above, in order for the light reflected from the original document sheet W to be received by the reading unit 13, the light source 8 must be retracted from the path of the reflected light. Accordingly, because the light source 8 emits illuminating light onto the original document sheet W from an angle, the distance L2 (see FIG. 9) between the light source 8 and the original document sheet W is long, reducing the illumination efficiency. Therefore, in order to ensure that an amount of light necessary for image reading is emitted, the voltage impressed between the electrodes 21 and 22 must be large, leading to such problems as increased power consumption and thermal deformation of the moving unit 6.

SUMMARY OF THE INVENTION

A main object of the present invention is to provide an image reading apparatus that enables reduced power consumption and prevention of heat generation through increased illumination efficiency, and to provide a light source used in such image reading apparatus.

In order to attain the above object, the image reading apparatus of the present invention includes a first light source having first and second light transmission areas that extend along the axial direction and face each other, a conveyance unit that conveys the original document sheet such that it faces the first light transmission area, and a reading unit that receives the light emitted toward the original document and reflected therefrom and reads the image of the original document sheet, wherein the light that is emitted through the first light transmission area and reflected by the original document sheet passes through the first and second light transmission areas and is led to the reading unit.

According to this construction, the illuminating light is emitted from the light source through the first light transmission area toward the original document sheet conveyed by the conveyance unit, and is reflected by the original document sheet. The light reflected from the original document sheet passes through the first and second transmission areas and is received by the reading unit. As a result, the image of the original document sheet is read.

The image reading apparatus having the construction described above may also include a moving unit that moves the first light source along the original document sheet when the conveyance unit has come to a stop. According to this construction, when the conveyance unit comes to a stop and the original document sheet is placed at a prescribed position, the first light source illuminates the original document sheet while being moved by the moving unit, and the reflected light is received by the reading unit.

In the image reading apparatus having the construction described above, it is also acceptable if the original document sheet is conveyed by the conveyance unit while it is in contact with the first transmission area.

The image reading apparatus having the construction described above may also include a second light source that is disposed at a distance from the original document sheet, as well as a moving unit that moves the second light source along the original document sheet when the conveyance unit has come to a stop, such that the light emitted from the second light source while it is moving and reflected by the original document sheet is received by the reading unit. According to this construction, when the conveyance unit comes to a stop and the original document sheet is placed at a prescribed position, the second light source illuminates the original document sheet while being moved by the moving unit, and the reflected light is received by the reading unit.

In the image reading apparatus having the construction described above, the first light source may comprise a fluorescent body that generates light based on the impression of a voltage, such fluorescent body being applied on the inner wall of a transparent tube, the first and second light transmission areas are formed so as to include at least part of non-applied areas on which the fluorescent body is not applied, and the width of the second light transmission area is narrower than the width of the non-applied area comprising the first light transmission area.

In the image reading apparatus having the construction described above, the first light source may have a cylindrical configuration.

In the image reading apparatus having the construction described above, the first light source may have a pole configuration with a polygonal cross-section.

The light source of the present invention comprises a fluorescent body that generates light based on impression of a voltage, such fluorescent body being applied on the inner wall of a transparent tube, the first and second light transmission areas are formed so as to include at least part of non-applied areas on which the fluorescent body is not applied, and the width of the second light transmission area is narrower than the width of the non-applied area comprising the first light transmission area.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
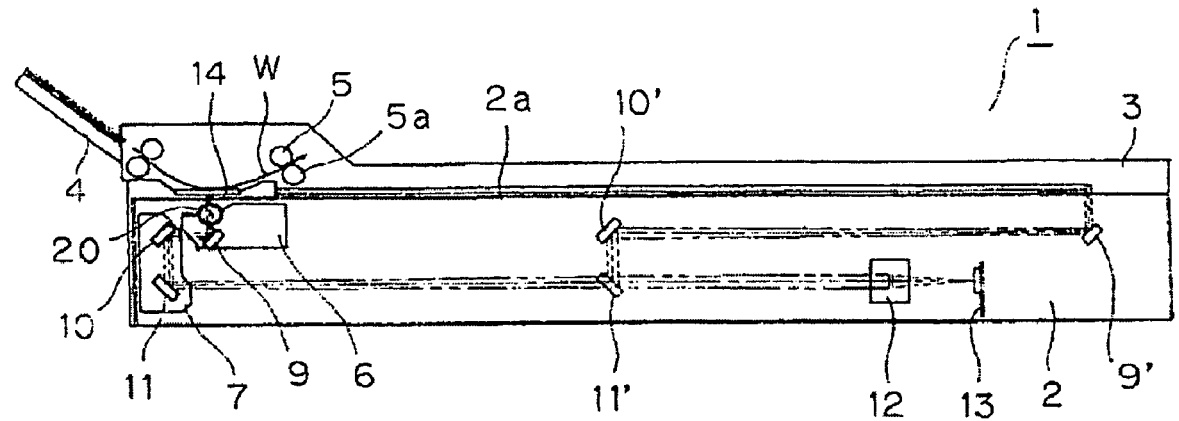
FIG. 1 is a cross-sectional side elevation of an image reading apparatus pertaining to a first embodiment of the present invention.
Figure 8:
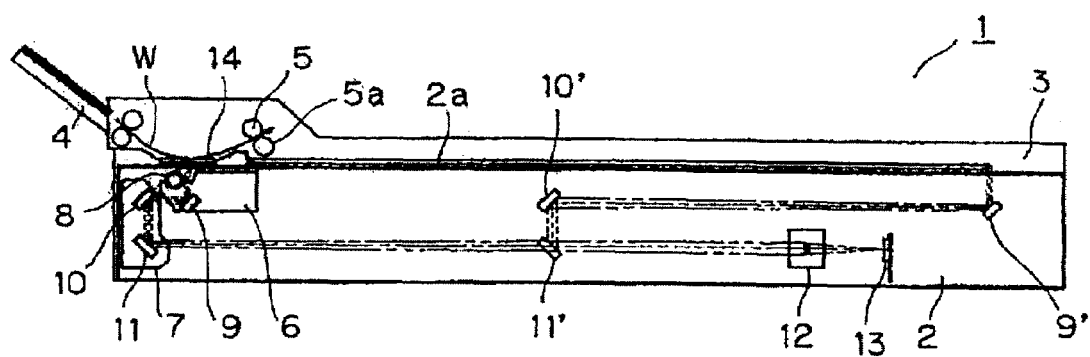
FIG. 8 is a cross-sectional side elevation of a conventional image reading apparatus.
Figure 9:
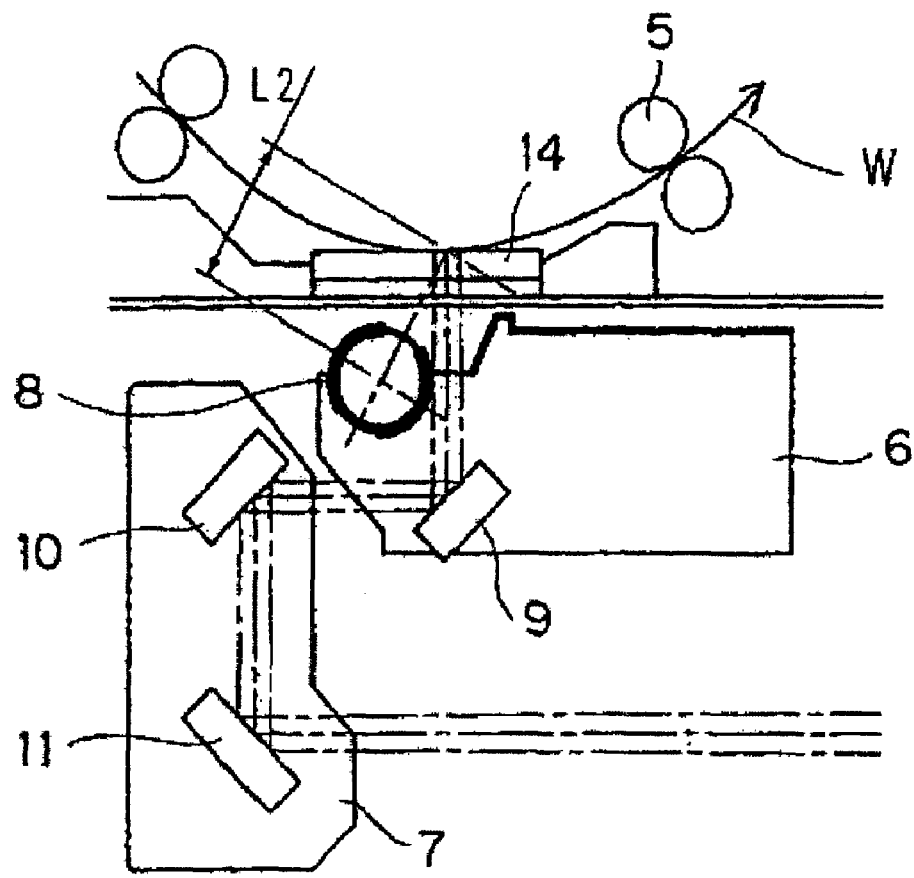
FIG. 9 is a detailed drawing of the essential components of the conventional image reading apparatus.
Figure 10:
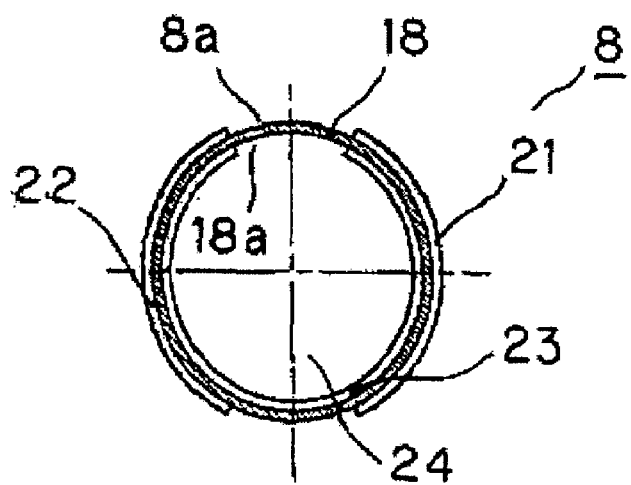
FIG. 10 is a cross-sectional side elevation of the light source of the conventional image reading apparatus.

Embodiments of the present invention are described below with reference to the drawings. FIG. 1 is a cross-sectional side elevation of an image reading apparatus pertaining to a first embodiment. For the sake of simplicity, components identical to those shown in FIGS. 8-10 showing a conventional art apparatus are identified using the same numbers as used therein. The image reading apparatus 1 comprises a main body 2 and a cover 3, which is pivotally supported on the main body 2, such that the cover 3 can be rotated up from the right-hand side in the figure. A conveyance unit 5 that conveys the original document sheet W using rollers 5a is disposed at one end of the cover 3.

A glass plate 14 is disposed on the surface of the cover 3 below the conveyance unit 5, such that the original document sheet W may be conveyed while remaining in contact with the glass plate 14. A paper supply tray 4 in which the original document sheets W that are supplied to the conveyance unit 5 is disposed adjacent to the conveyance unit 5. It is also possible to rotate up the cover 3 and place an original document sheet W on the top surface 2a of the main body 2.

Figure 2:
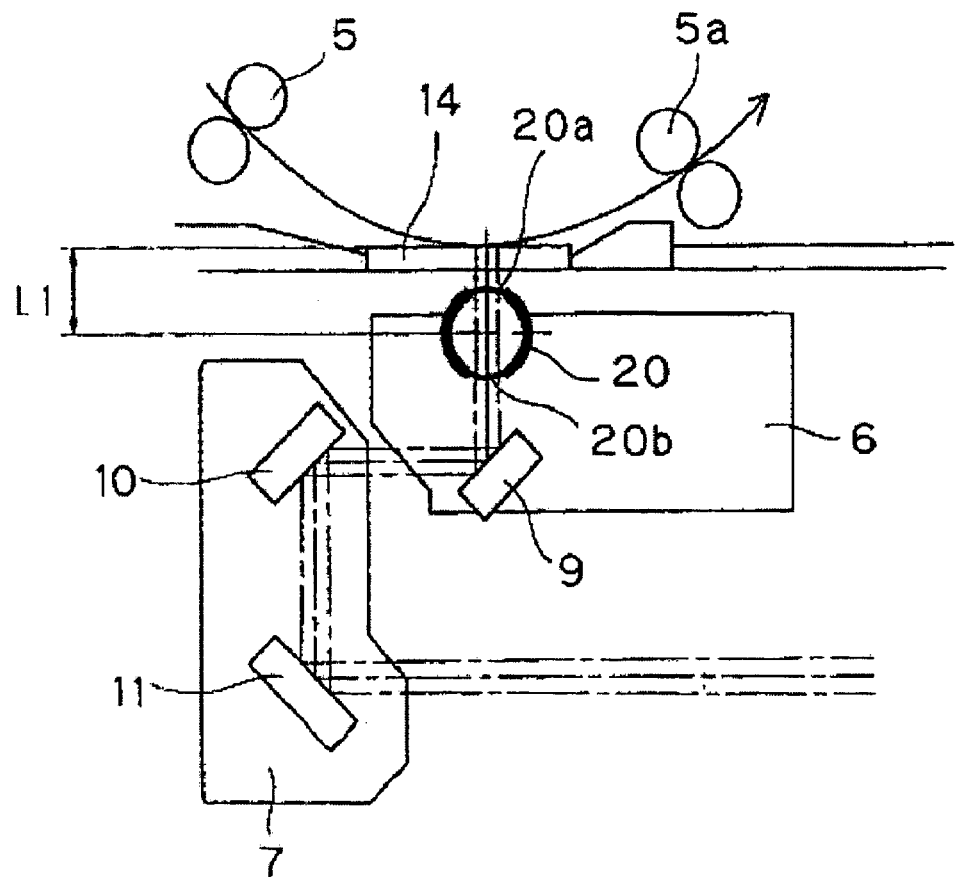
FIG. 2 is a detailed drawing of the essential components of the image reading apparatus pertaining to the first embodiment of the present invention.

Moving units 6 and 7 that can move along the scanning path (rightward and leftward in the figure) are disposed inside the main body 2. FIG. 2 shows the details of the conveyance unit 5 and the moving units 6 and 7. A light source (first light source) 20 that emits illuminating light from below toward the original document sheet W on the glass plate 14 is disposed on the moving unit 6.

Figure 3:
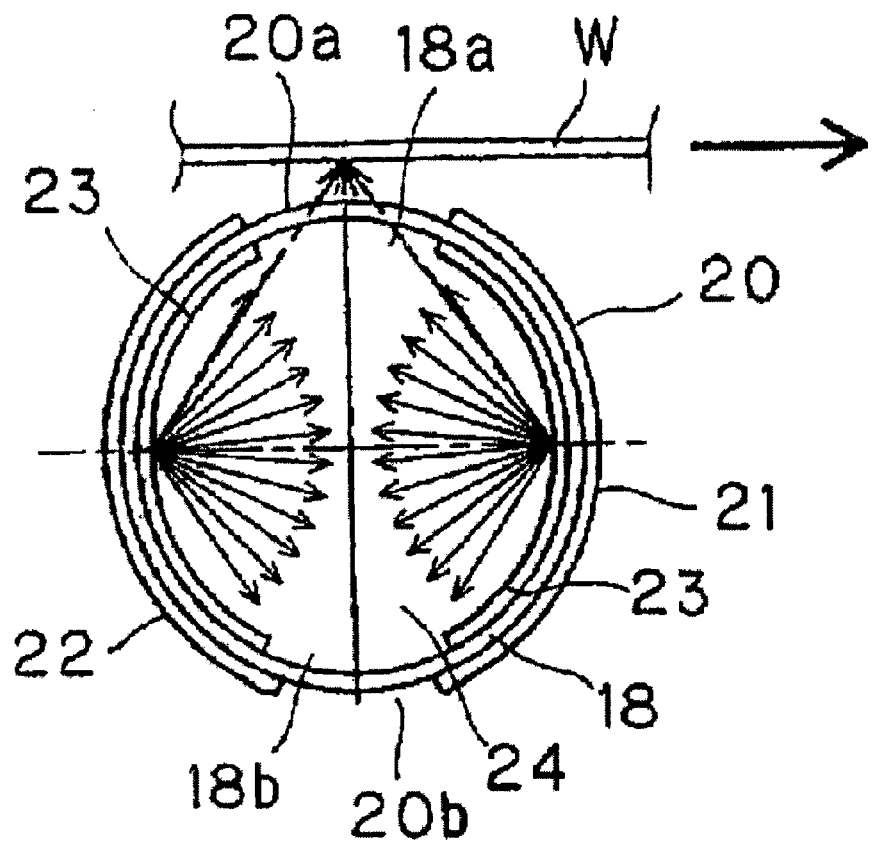
FIG. 3 is a cross-sectional side elevation of the light source of the image reading apparatus pertaining to the first embodiment of the present invention.

The light source 20 has the shape of a cylinder that extends perpendicular to the scanning path. FIG. 3 shows a cross-sectional view of the light source 20. The light source 20 comprises a cylindrical glass tube (transparent tube) 18, on the inner wall of which is applied a fluorescent body 23, and electrodes 21 and 22 mounted to the outer circumference thereof. The glass tube 18 is filled with a rare gas 24 such as xenon gas.

Non-applied areas 18a and 18b, on which the fluorescent body 23 is not applied, are formed in part of the glass tube 18, with the non-applied area 18a comprising a first light transmission area 20a that transmits light. The gap between the electrodes 21 and 22, which is narrower than the width of the non-applied area 18b, comprises a second light transmission area 20b. The electrodes 21 and 22 may also be disposed closer to each other such that the gap therebetween is narrower than the width of the non-applied area 18a and comprises the first light transmission area 20a. The gap between the electrodes 21 and 22 may furthermore be widened such that it is larger than the non-applied area 18b and comprises the second light transmission area 20b.

When a voltage is impressed between the electrodes 21 and 22, the atoms of the rare gas 24 such as xenon become excited and generate ultraviolet light. The ultraviolet light enters the fluorescent body 23, where it is converted into visible light which is then emitted in various directions as shown by the arrows. These light rays are repeatedly reflected in the glass tube 18, and are emitted via the first and second light transmission areas 20a and 20b. As a result, illuminating light that illuminates the original document sheet W is emitted via the first light transmission area 20a. The electrodes 21 and 22 may be disposed between the glass tube 18 and the fluorescent body 23.

With reference to FIGS. 1 and 2, a reflection mirror 9 that reflects light is disposed under the light source 20 in the moving unit 6. Reflection mirrors 10 and 11 that receive the light reflected from the reflection mirror 9 and lead it parallel to the scanning path are disposed in the moving unit 7. An image forming lens 12 and a reading unit 13 are disposed in the lower part of the main body 2 such that they face the reflection mirror 11. The image forming lens 12 receives the light reflected by the reflection mirror 11 and causes it to form an image. The reading unit 13 comprises a CCD, which receives the light of the image formed by the image forming lens 12 and converts it into electrical signals.

In the image reading apparatus 1 having the construction described above, when an original document W is placed in the paper supply tray 4 and the conveyance unit 5 is driven, a voltage is impressed between the electrodes 21 and 22 of the light source 20 with the moving units 6 and 7 positioned as shown in FIG. 1. In the light source 20, the fluorescent body 23 generates light, and illuminating light is emitted via the first light transmission area 20a.

The illuminating light illuminates the original document sheet W conveyed at a prescribed speed by the conveyance unit 5, and is reflected by the original document sheet W. The reflected light from the original document sheet W enters the light source 20 via the first light transmission area 20a, and is emitted from the second light transmission area 20b. It is then reflected by the reflection mirrors 9, 10 and 11, and is caused by the image forming lens 12 to form an image on the reading unit 13. As a result, the image of the original document sheet is read by the reading unit 13, whereby electrical signals corresponding to the image of the original document sheet are output from the reading unit 13.

When an original document sheet W is placed on the top surface 2a of the main body 2, the moving units 6 and 7 move at a prescribed speed along the scanning path. As the moving units 6 and 7 move, the reflection mirrors 9, 10 and 11 move to the positions 9', 10' and 11', respectively, scanning the original document sheet W, whereby the original document image is read by the reading unit 13.

According to this embodiment, by providing the apparatus with first and second light transmission areas 20a and 20b, the light source 20 can be placed immediately below the original document sheet W, and consequently, the distance L1 (see FIG. 2) between the light source 20 and the original document sheet W can be reduced. Therefore, illumination efficiency increases, the amount of light necessary to perform image reading can be ensured using less power, and deformation of the moving unit 6 and the like due to the heat generated by the light source can be prevented.

Figure 4:
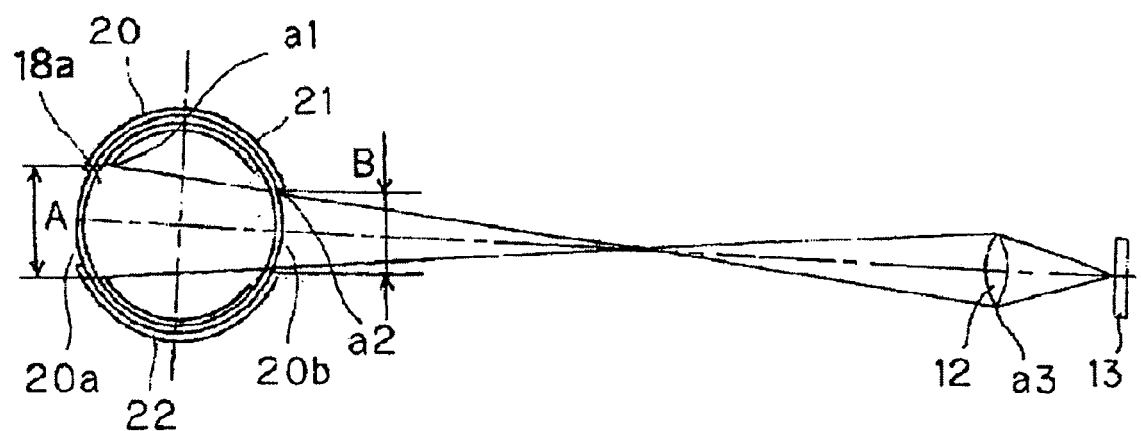
FIG. 4 is a drawing that shows the path traveled by the light that is emitted from the light source of the image reading apparatus pertaining to the first embodiment of the present invention.

When the light generated by the fluorescent body 23 and emitted via the second light transmission area 20b is received by the reading unit 13, there is a possibility that the read image may deteriorate due to light that is different from the light reflected from the original document sheet W. Because of this possibility, as shown in FIG. 4, the ends a2 of the electrodes 21 and 22 on the side of the second light transmission area 20b are disposed inside the lines that connect the ends a1 of the non-applied area 18a on the side of the first light transmission area 20a and the ends a3 of the image forming lens 12. In other words, the width B of the second light transmission area 20b is made to be narrower than the width A of the non-applied area 18a. As a result, the light generated by the fluorescent body 23 and emitted via the second light transmission area 20b does not enter the image forming lens 12, and therefore is not received by the reading unit 13, thereby preventing deterioration of the image.

If the light path between the light source 20 and the image forming lens 12 is long, the light that is emitted from the ends al of the fluorescent body 23 and passes through the ends a3 of the image forming lens 12 runs essentially parallel to the optical axis. Consequently, if the width A of the non-applied area 18a and the width B of the second light transmission area 20b are the same, the image is read with minimal image deterioriation.

Figure 5:
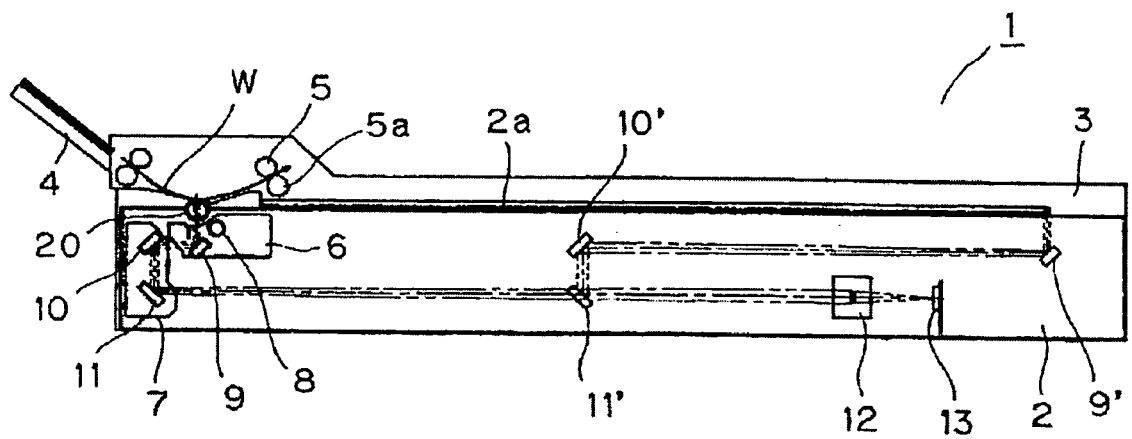
FIG. 5 is a cross-sectional side elevation of an image reading apparatus pertaining to a second embodiment of the present invention.
Figure 6:
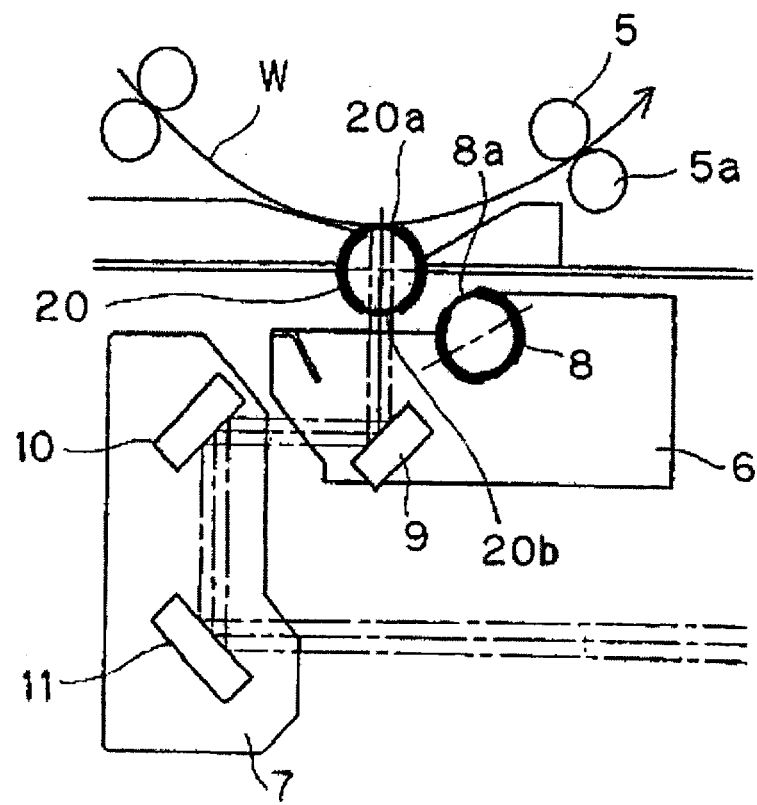
FIG. 6 is a detailed drawing of the essential components of the image reading apparatus pertaining to the second embodiment of the present invention.

FIGS. 5 and 6 are a cross-sectional side elevation and a detailed drawing of the essential components of an image reading apparatus pertaining to a second embodiment. For the sake of simplicity, components that are identical to those in the first embodiment shown in FIGS. 1-4 are identified using the same numbers as used therein. The second embodiment differs from the first embodiment in that the glass plate 14 (see FIG. 2) is not used, and the light source (first light source) 20 is disposed at a position higher than in the first embodiment. The original document sheet W conveyed by the conveyance unit 5 comes into direct contact with the glass tube 18 of the light source 20.

In addition, a light source (second light source) 8, which is similar to that used in the conventional model shown in FIG. 10 described above, is disposed in the moving unit 6 such that the original document sheet W placed on the top surface 2a of the main body 2 is illuminated at an angle from below. The second embodiment is identical to the first embodiment with regard to other aspects of the construction.

In the image reading apparatus having the construction described above, when an original document W is placed in the paper supply tray 4 and the conveyance unit 5 is driven, a voltage is impressed between the electrodes 21 and 22 of the light source 20 with the moving units 6 and 7 positioned as shown in FIG. 5. In the light source 20, the fluorescent body 23 generates light, while illuminating light is emitted via the first light transmission area 20a.

The illuminating light illuminates the original document sheet W conveyed at a prescribed speed by the conveyance unit 5, and is reflected by the original document sheet W. The light reflected from the original document sheet W passes through the first light transmission area 20a, enters the light source 20, and exits the light source 20 via the second light transmission area 20b. It is then reflected by the reflection mirrors 9, 10 and 11 and is caused by the image forming lens 12 to form an image on the reading unit 13. Consequently, the reading unit 13 reads the image of the original document sheet, and electrical signals corresponding thereto are output from the reading unit 13.

When an original document sheet W is placed on the top surface 2a of the main body 2, the moving units 6 and 7 move along the scanning path at a prescribed speed, and illuminating light is emitted from the light source 8 via the light transmission area 8a. The light illuminates the original document sheet W, is reflected thereby, and is caused by the image forming lens 12 to form an image on the reading unit 13 after being reflected by the reflection mirrors 9, 10 and 11. As the moving units 6 and 7 move, the reflection mirrors 9, 10 and 11 move to the positions 9', 10' and 11', respectively, scanning the original document sheet W. As a result, the reading unit 13 reads the original document image, and electrical signals corresponding to the image of the original document sheet are output from the reading unit 13.

According to this embodiment, because the light source 20 and the original document sheet W are in contact with each other when the original document sheet W is conveyed by the conveyance unit 5, further improved illumination efficiency can be obtained. Therefore, an amount of light necessary for image reading can be obtained with less power consumption, deformation of the moving unit 6 and the like due to the heat generated by the light source can be further prevented.

Figure 7:
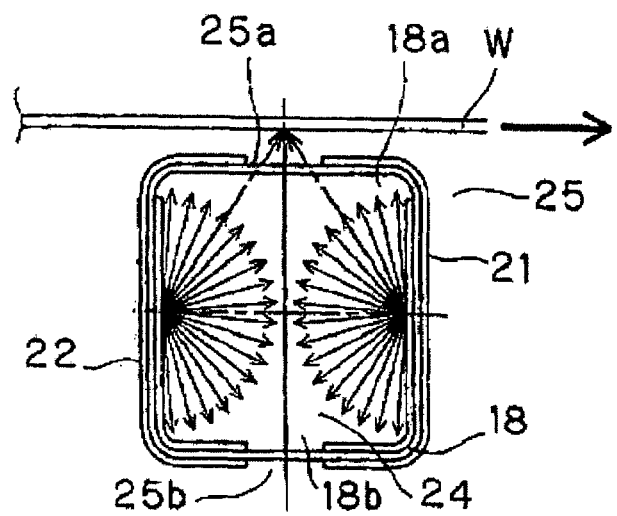
FIG. 7 is a cross-sectional side elevation of another light source that may be used in the image reading apparatus pertaining to the first or second embodiment of the present invention.

While a cylindrical light source 20 is used in the first and second embodiments, a light source 25 having the configuration of a pole with a polygonal cross-section may be used instead, as shown in FIG. 7. The same effects obtained with the first or second embodiment are obtained by providing the light source with first and second light transmission areas 25a and 25b that face each other as in the above embodiments. In addition, even if the position of the light source 25 becomes offset in either direction along the scanning path, warping of the image due to inflection by the glass tube 18 is prevented.

According to the present invention, because the first light source has first and second light transmission areas that face each other, and the reflected light from the original document sheet is led to the reading unit via the first and second transmission areas, the first light source can be disposed immediately below the original document sheet. As a result, the distance between the first light source and the original document sheet can be reduced. Therefore, illumination efficiency increases, such that an amount of light necessary for image reading can be obtained using less power consumption, and deformation due to the heat generated by the light source can be further prevented.

According to the present invention, because the original document sheet conveyed by the conveyance unit and the first light source are in contact with each other, illumination efficiency can be further improved.

According to the present invention, because the second light transmission area is narrower than the non-applied area on the side of the first light transmission area, the light generated by the fluorescent body and emitted via the second light transmission area is not received by the reading unit, thereby enabling image deterioration to be prevented.

Although the present invention has been fully described by way of example with reference to the accompanying drawings, it is to be noted that various changes and modifications will be apparent to those skilled in the art. Therefore, unless such changes and modification depart from the scope of the present invention, they should be construed as being included therein.

What is claimed is:

1. An image reading apparatus comprising:
a first light source having first and second light transmission areas that extend along an axial direction and face each other;
a conveyance unit that conveys an original document sheet such that it faces the first light transmission area;
a reading unit that receives light emitted toward the original document and reflected therefrom and reads an image of the original document sheet;
a second light source that is disposed at a distance from the original document sheet; and
a moving unit that moves the second light source along the original document sheet when the conveyance unit has come to a stop, such that the light emitted from the second light source while it is moving and reflected by the original document sheet is received by the reading unit,
wherein the light that is emitted through the first light transmission area and reflected by the original document sheet passes through the first and second light transmission areas and is led to the reading unit.

2. The image reading apparatus of claim 1, further comprising:
a moving unit that moves the first light source along the original document sheet when the conveyance unit has come to a stop.

3. The image reading apparatus of claim 1, wherein the conveyance unit conveys the original document sheet while it is in contact with the first transmission area.

4. The image reading apparatus of claim 1, wherein the first light source comprise a fluorescent body that generates light based on the impression of a voltage, such fluorescent body being applied on an inner wall of a transparent tube, the first and second light transmission areas are formed so as to include at least part of non-applied areas on which the fluorescent body is not applied.

5. The image reading apparatus of claim 4, wherein a width of the second light transmission area is narrower than a width of the non-applied area comprising the first light transmission area.

6. The image reading apparatus of claim 1, wherein the first light source has a cylindrical configuration.

7. An image reading apparatus comprising:
a first light source having first and second light transmission areas that extend along an axial direction and face each other;
a conveyance unit that conveys an original document sheet such that it faces the first light transmission area; and
a reading unit that receives light emitted toward the original document and reflected therefrom and reads an image of the original document sheet;
wherein the light that is emitted through the first light transmission area and reflected by the original document sheet passes through the first and second light transmission areas and is led to the reading unit, and
wherein the first light source has a pole configuration with a polygonal cross-section.

* * * * *